United States Patent
Tan et al.

(10) Patent No.: US 10,650,260 B2
(45) Date of Patent: May 12, 2020

(54) PERSPECTIVE DISTORTION CHARACTERISTIC BASED FACIAL IMAGE AUTHENTICATION METHOD AND STORAGE AND PROCESSING DEVICE THEREOF

(71) Applicant: INSTITUTE OF AUTOMATION, CHINESE ACADEMY OF SCIENCES, Beijing (CN)

(72) Inventors: Tieniu Tan, Beijing (CN); Jing Dong, Beijing (CN); Wei Wang, Beijing (CN); Bo Peng, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 16/488,600

(22) PCT Filed: Jun. 23, 2017

(86) PCT No.: PCT/CN2017/089685
§ 371 (c)(1),
(2) Date: Aug. 26, 2019

(87) PCT Pub. No.: WO2018/232717
PCT Pub. Date: Dec. 27, 2018

(65) Prior Publication Data
US 2020/0026941 A1    Jan. 23, 2020

(51) Int. Cl.
G06K 9/00 (2006.01)
G06T 7/80 (2017.01)
G06K 9/48 (2006.01)

(52) U.S. Cl.
CPC ..... G06K 9/00899 (2013.01); G06K 9/00214 (2013.01); G06K 9/00268 (2013.01);
(Continued)

(58) Field of Classification Search
CPC .......... G06K 9/00899; G06K 9/00214; G06K 9/00268; G06K 9/00288; G06K 9/48; G06T 7/80
See application file for complete search history.

(56) References Cited

U.S. PATENT DOCUMENTS 7,848,548 B1 * 12/2010 Moon ................ G06K 9/00281
382/100
8,208,717 B2 * 6/2012 Xiao ...................... G06K 9/621
345/420

(Continued)

FOREIGN PATENT DOCUMENTS

CN    102999942 A    3/2013
CN    105184283 A    12/2015
(Continued)

OTHER PUBLICATIONS

Wen, Di, et al. Face Spoof Detection with Image Distortion Analysis. IEEE Transactions on Information Forensics & Security, 2015, pp. 746-761.
(Continued)

Primary Examiner — Santiago Garcia
(74) Attorney, Agent, or Firm — Bayramoglu Law Offices LLC (57) ABSTRACT

A perspective distortion characteristic based facial image authentication method and storage and processing device thereof are proposed. The method includes: S1: recognizing key points and a contour in a 2D facial image; S2: acquiring key points in a corresponding 3D model; S3: calculating camera parameters based on a correspondence between the key points in the 2D image and the key points in the 3D model; S4: optimizing the camera parameters based on the contour in the 2D image; S5: sampling the key points in the two-dimensional facial image by multiple times to obtain a camera intrinsic parameter estimation point cloud; and S6:
(Continued)

calculating the inconsistency between the camera intrinsic parameter estimation point cloud and the camera nominal intrinsic parameters, and determining the authenticity of the facial image. The present disclosure can effectively authenticate the 2D image and has a relatively higher accuracy.

11 Claims, 4 Drawing Sheets

(52) U.S. Cl.
CPC ........... *G06K 9/00288* (2013.01); *G06K 9/48* (2013.01); *G06T 7/80* (2017.01); *G06T 2207/10028* (2013.01); *G06T 2207/30201* (2013.01)

(56) References Cited

U.S. PATENT DOCUMENTS

| | | | | |
|---|---|---|---|---|
| 2003/0234871 | A1* | 12/2003 | Squilla | G06T 11/60 348/220.1 |
| 2010/0246905 | A1* | 9/2010 | Yuasa | G06K 9/00261 382/118 |
| 2012/0081568 | A1* | 4/2012 | Suzuki | G06T 19/20 348/222.1 |
| 2013/0121526 | A1* | 5/2013 | Smolyanskiy | G06T 17/00 382/103 |
| 2015/0125049 | A1* | 5/2015 | Taigman | G06T 3/0006 382/118 |
| 2016/0070952 | A1* | 3/2016 | Kim | G06K 9/00208 382/118 |
| 2016/0104309 | A1* | 4/2016 | Kim | G06F 16/51 382/118 |

FOREIGN PATENT DOCUMENTS

| | | |
|---|---|---|
| CN | 106295530 A | 1/2017 |
| EP | 1962497 A1 | 8/2008 |

OTHER PUBLICATIONS

Tirunagari, Santosh et al. Detection of Face Spoofing Using Visual Dynamics. IEEE Transactions on Information Forensics & Security, Apr. 2015, vol. 10, No. 4, pp. 762-777.

B. Peng, et al. Optimized 3D Lighting Environment Estimation for Image Forgery Detection, IEEE Transactions on Information Forensics and Security, Feb. 2017, vol. 12, No. 2, pp. 479-494.

B. Peng, et al. Detection of Computer Generated Faces in Videos Based on Pulse Signal. IEEE China Summit and International Conference on Signal and Information Processing(China SIP), 2015, pp. 841-845.

\* cited by examiner

PERSPECTIVE DISTORTION CHARACTERISTIC BASED FACIAL IMAGE AUTHENTICATION METHOD AND STORAGE AND PROCESSING DEVICE THEREOF

CROSS REFERENCE TO RELATED APPLICATIONS

This application is the national phase entry of International Application PCT/CN2017/089685, filed on Jun. 23, 2017.

TECHNICAL FIELD

The present disclosure relates to the fields of facial image recognition, computer vision, and image forensics, in particular to a perspective distortion characteristic based facial image authentication method and storage and processing device thereof.

BACKGROUND

In the era dominated by intelligentization, the importance of digital images can never be overemphasized. The technology of facial recognition, which can automatically recognize people's identity with facial images, is widely applied in the fields including intelligent security, identity authentication, and internet finance, etc. However, methods for spoofing the facial recognition system emerge one after another. For example, the recognition system may be deceived by facial photos and mistakenly determine that the individual is who he/she claims to be on the spot while he/she does not show up. This deficiency has made the security of the facial recognition system highly questionable. In addition to the deception on the facial recognition system, the authenticity of the facial image itself is also a matter of great concern. Today, as image editing software, such as ADOBE PHOTOSHOP, becomes increasingly accessible, the tampering of image content seriously threatens the fields such as media and publishing industry, court forensics, insurance industry and other industries that are highly dependent on image credibility. Among them, facial image tampering, such as image recapturing and face splicing, is more dangerous. This is also an important topic in the field of digital image forensics. The photo spoof detection of the facial recognition system is also called living body detection, which is essentially an image recapture detection, and belongs to the category of image forensics.

At present, the disclosed live facial detection technology mainly uses a machine learning framework of feature design+classification, and texture characteristics, dynamic characteristics and the like are mainly considered. The following literatures may be referred: Wen, Di, H. Han, and A. K. Jain. "Face Spoof Detection With Image Distortion Analysis." Information Forensics & Security IEEE Transactions on 10.4(2015):746-761. and Tirunagari, Santosh, et al. "Detection of Face Spoofing Using Visual Dynamics." Information Forensics & Security IEEE Transactions on 10.4(2015):762-777. In the field of image forensics, tampering detection technique for facial images and videos involves the use of illumination inconsistencies, human pulse signals, etc., which may be referred to in: B. Peng, W. Wang, J. Dong, and T. Tan, "Optimized 3D Lighting Environment Estimation for Image Forgery Detection," IEEE Transactions on Information Forensics and Security, vol. 12, pp. 479-494, 2017. and B. Peng, W. Wang, J. Dong, and T. Tan, "Detection of computer generated faces in videos based on pulse signal," in 2015 IEEE China Summit and International Conference on Signal and Information Processing (ChinaSIP), 2015, pp. 841-845.

The present disclosure proposes a perspective distortion characteristic based facial image authentication method to effectively perform facial image authentication and can be applied to the fields of live face detection and facial image tampering detection, etc.

SUMMARY

In order to solve the above problems in the prior art, namely, to perform facial image authentication based on perspective distortion characteristic of a facial image captured by a camera, in one aspect, the present disclosure provides a perspective distortion characteristic based facial image authentication method, which includes the following steps:

step S1: recognizing key points and a contour in a two-dimensional facial image;

step S2: acquiring key points in a three-dimensional facial model based on the three-dimensional facial model corresponding to the facial image;

step S3: calculating camera parameters based on a correspondence between the key points in the two-dimensional facial image and the key points in the three-dimensional facial model;

step S4: optimizing the camera parameters obtained in step S3 based on the contour in the two-dimensional facial image;

step S5: randomly sampling points from the key points in the two-dimensional facial image, and repeating steps S3 and S4 until a preset loop condition is satisfied; obtaining a camera intrinsic parameter estimation point cloud according to the camera parameters acquired in step S4 in each loop; and step S6: calculating an inconsistency between the camera intrinsic parameter estimation point cloud and camera nominal intrinsic parameters, and determining an authenticity of the facial image based on the inconsistency; wherein the camera nominal intrinsic parameters are the parameters of the camera capturing the two-dimensional facial image.

Preferably, the method for calculating the camera parameters in step S3 includes:

step S31: calculating a camera projection matrix by using a gold standard method based on the key points in the two-dimensional facial image and the key points in the three-dimensional facial model; and step S32: based on the camera projection matrix calculated in step S31, solving for the camera parameters of 9 degrees of freedom by adding a constraint that a pixel unit is square; the camera parameters of 9 degrees of freedom include camera intrinsic parameters of 3 degrees of freedom and camera extrinsic parameters of 6 degrees of freedom.

Preferably, optimizing the camera parameters in step S4 refers to optimizing the camera parameters through an optimization function) $E_{totle}(\theta)$ which is expressed below:

$$E_{totle}(\theta) = E_{cont}(\theta) + \lambda E_{land}(\theta)$$

where $\theta$ refers to the camera parameters of 9 degrees of freedom, $E_{cont}$ refers to a sum of squared errors between a two-dimensional projection of the contour in the three-dimensional facial model and the contour in the two-dimensional facial image, $E_{land}$ refers to a sum of squared errors between a two-dimensional projection of the key points in the three-dimensional facial model and the key points in the two-dimensional facial image, and λ is a weight coefficient.

Preferably, the optimization function $E_{totle}(\theta)$ is solved based on an iterative closest point algorithm, in each iteration of the iterative closest point algorithm, a Levenberg-Marquardt algorithm is used to optimize a nonlinear least squares problem.

Preferably, in step S5, the key points in the two-dimensional facial image are randomly sampled and the samples follow a Gaussian distribution centered on an initial position, and an average error of the key points optimized in step S4 is a standard deviation;

where $E_{land}$ is the sum of the squared errors between the two-dimensional projection of the key points in the three-dimensional facial model and the key points in the two-dimensional facial image.

Preferably, the method for calculating the inconsistency between the camera intrinsic parameter estimation point cloud and the camera nominal intrinsic parameters in step S6 is as follows:

expressing the inconsistency with a Mahalanobis distance D between the camera intrinsic parameter estimation point cloud and the camera nominal intrinsic parameters;

$$D(\{\hat{\theta}_i^{in}\},\theta^{in}) = \sqrt{(\theta^{in}-\mu)^T \Sigma^{-1}(\theta^{in}-\mu)}$$

where $\{\hat{\theta}_i^{in}\}$ is the camera intrinsic parameter estimation point cloud, $\theta^{in}$ is the camera nominal intrinsic parameter, μ and Σ refer to an average value and a covariance matrix of ΘN, respectively.

Preferably, the method for determining the authenticity of the facial image based on the inconsistency is as follows:

if $D>D_t$, the image is determined as a deceptive image, otherwise the image is determined as a normal image;

where $D_t$ is a preset determination threshold.

Preferably, $E_{land}(\theta) = \Sigma_{i=1}^{N_l} d(v_i, P(\theta)V_i)^2$ where θ represents constrained camera parameters of 9 degrees of freedom, v and V respectively represent the key points in the two-dimensional facial image and the key points in the three-dimensional facial model, and $N_l$ is a number of the key points.

Preferably, $E_{cont}(\theta) = \Sigma_{i=1}^{N_c} d(c_i, P(\theta)C_i)^2$ where θ represents constrained camera parameters of 9 degrees of freedom, $N_c$ is a number of the contour, c and C respectively represent contour points in the two-dimensional facial image and contour points in the three-dimensional facial model.

Preferably, the preset loop condition in step S5 is a predetermined number of the loops.

In another aspect, the present disclosure proposes a storage device where a plurality of programs are stored, and the programs are capable of being loaded by a processor to execute the perspective distortion characteristic based facial image authentication method.

In a third aspect, the present disclosure proposes a processing device which includes:

a processor, capable of executing the programs; and a storage device, capable of storing the plurality of programs.

The programs are capable of being loaded by a processor to execute the perspective distortion characteristic based facial image authentication method.

The present disclosure utilizes the inconsistency between the perspective distortion characteristic presented by the two-dimensional facial image and the perspective distortion characteristic which is expected to be presented with the camera nominal intrinsic parameter to detect the facial image spoof. The present disclosure can effectively realize the authentication of the two-dimensional facial image. The present disclosure has a high accuracy and a large application potential in the fields of human live face detection and facial image tampering detection, etc.

DETAILED DESCRIPTION OF THE EMBODIMENTS

The preferred embodiments of the present disclosure will be described hereinafter with reference to the drawings. Those skilled in the art should understand that these embodiments are merely used to illustrate the principle of the present disclosure rather than limit the scope of the present disclosure.

The basis of the present disclosure is that the facial image will present different perspective distortion characteristics under different camera parameters. For example, when a camera is in a close range to the face and uses a short focal length, the facial image presents a large perspective distortion, for example, the nose may appear to be large. While, when the camera is at a distance from the face and uses a long focal length, the facial image is closer to an orthogonal projection with less perspective distortion. The present disclosure detects the facial image spoof based on the inconsistency between the perspective distortion characteristics presented by the image (i.e., the two-dimensional facial image) to be detected and the perspective distortion characteristics that are expected to be presented with the camera nominal intrinsic parameters. The image observations for presenting the perspective distortion characteristic in the present disclosure are facial key points and contour (the contour refers to the contour generated by self-occlusion), and the image observations of the two-dimensional facial image and the three-dimensional facial model information are used to estimate the camera intrinsic parameters. Finally, the facial image is authenticated by determining and estimating the inconsistency between the camera intrinsic parameters and the camera nominal intrinsic parameters.

Figure 1:
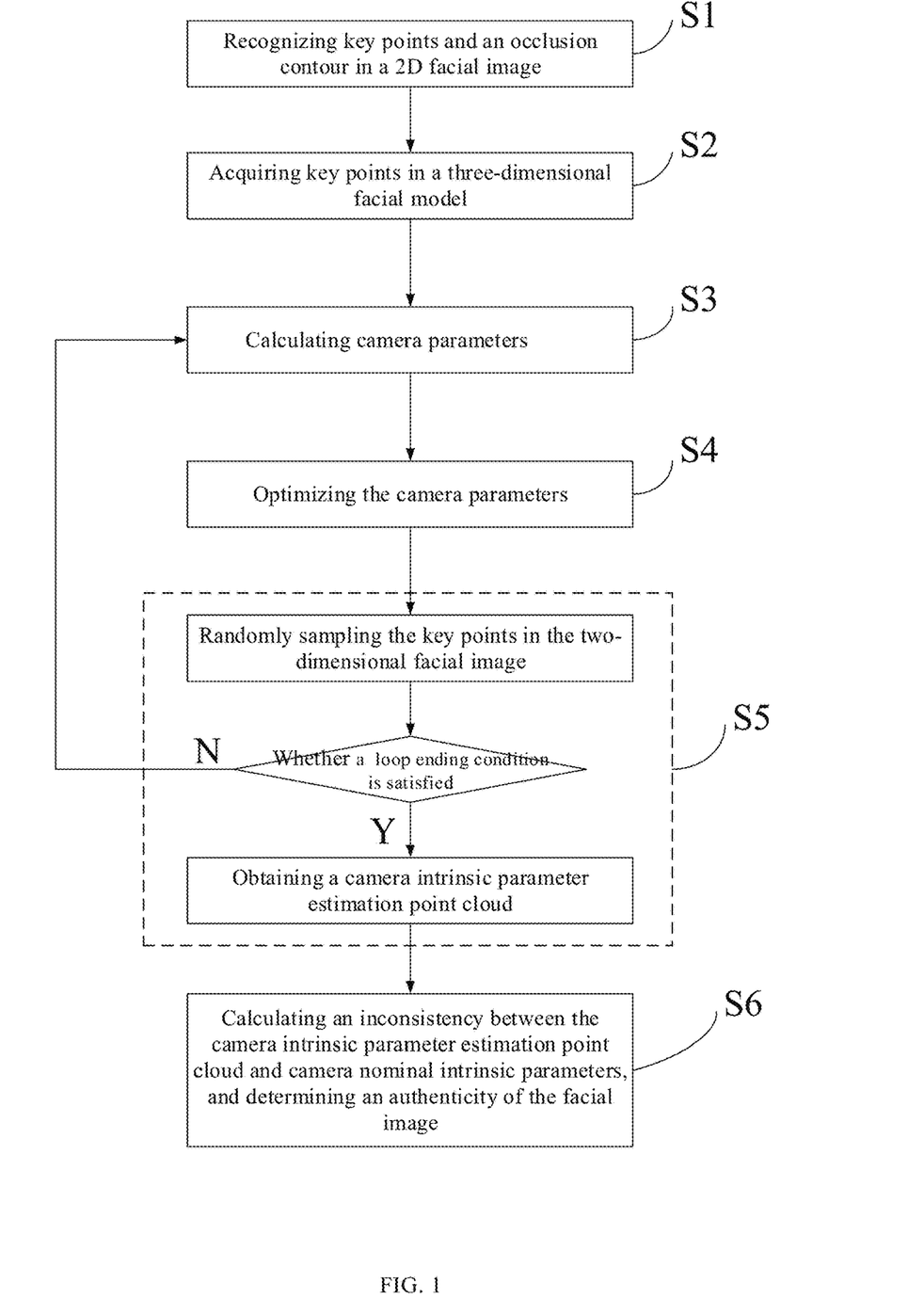
FIG. 1 is a schematic flow chart showing a perspective distortion characteristic based facial image authentication method according to the present disclosure.

As shown in FIG. 1, a perspective distortion characteristic based facial image authentication method of the present disclosure, includes the following steps:

step S1: key points and a contour in a two-dimensional facial image are recognized;

step S2: key points in a three-dimensional facial model are acquired based on the three-dimensional facial model corresponding to the facial image;

step S3: the camera parameters are calculated based on a correspondence between the key points in the two-dimensional facial image and the key points in the three-dimensional facial model;

step S4: the camera parameters obtained in step S3 are optimized based on the contour in the two-dimensional facial image;

step S5: the key points in the two-dimensional facial image are randomly sampled, and steps S3 and S4 are repeated until the preset loop condition is satisfied; a camera intrinsic parameter estimation point cloud is obtained according to the camera parameters acquired in step S4 in each loop; and step S6: an inconsistency between the camera intrinsic parameter estimation point cloud and the camera nominal intrinsic parameters is calculated, and the authenticity of the facial image is determined based on the inconsistency; and the camera nominal intrinsic parameters are the parameters of the camera capturing the two-dimensional facial image.

Image recapturing and image splicing are two common methods for forging images. Secondary imaging of the system camera may occur by attacking the target facial image of the facial recognition system, which is equivalent to image recapturing, leading to inconsistency between the observed perspective distortion characteristics in the image and the perspective distortion characteristics of the nominal camera. Face splicing in image tampering also causes inconsistency between the perspective distortion characteristics of the spliced face and the camera of a host picture (nominal camera). The technical solutions of the present disclosure are described hereinafter in detail with the facial image recapturing as an example.

Figure 2:
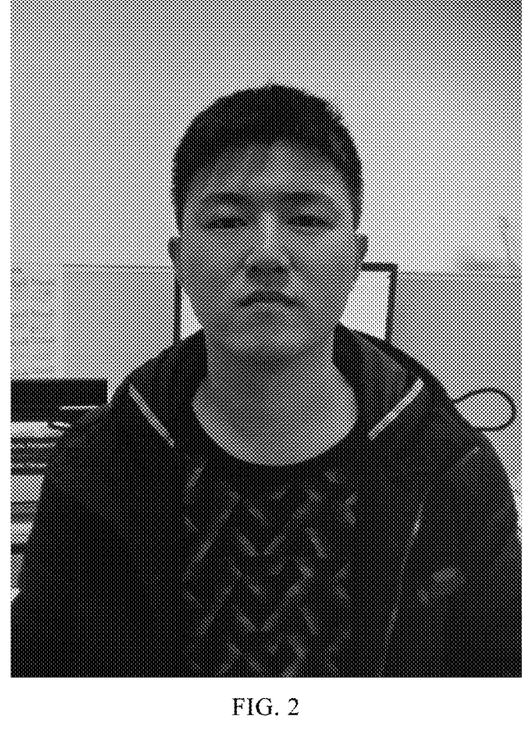
FIG. 2 is a diagram showing an example of a recaptured two-dimensional facial image to be detected according to an embodiment of the present disclosure.

FIG. 2 shows a recaptured photo of a facial image in which the abnormalities cannot be recognized by human eyes. The original photo of the image was taken by an IPHONE 5S rear camera and then displayed on a screen, and the photo shown in FIG. 2 is recaptured by a NIKON D750 camera.

To clarify the technical solutions of the present disclosure, the steps are successively described in detail as follows.

According to an embodiment of the present disclosure, a perspective distortion characteristic based facial image authentication method includes steps S1-S5, which are specifically described below.

Step S1: the key points and the contour in the two-dimensional facial image are recognized.

Figure 3:
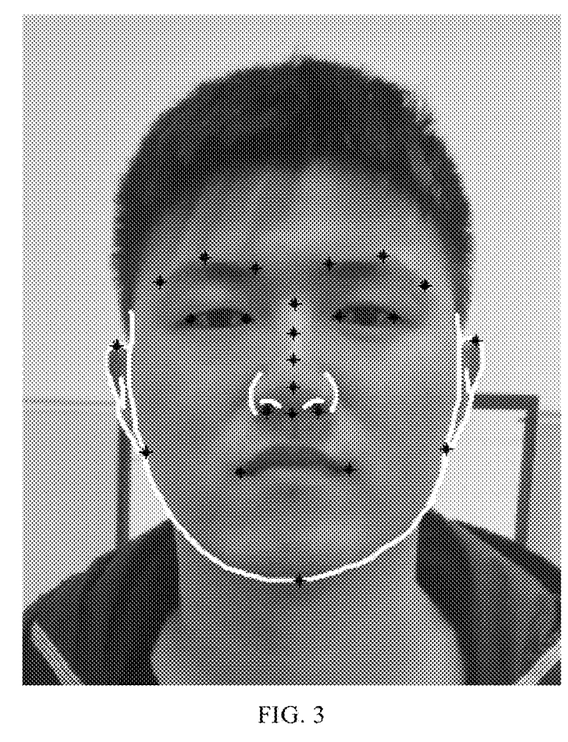
FIG. 3 is a schematic diagram showing key points and contours of a face in a 2D image according to an embodiment of the present disclosure.

In the present embodiment, an example of the recognized facial key points and contour of the two-dimensional facial image (which may be simplified as a 2D image hereinafter for the sake of convenience) for authenticity is shown in FIG. 3.

24 facial key points are defined in this embodiment, including 19 internal key points (including eyebrows, the corners of eyes, nose, the corners of mouth, etc.) and 5 external key points (including ears, chin, etc.). When some of the key points are occluded due to a change in posture, only the visible key points are used for calculation. The key points can be located by using an automatic detection algorithm, such as an SDM (Supervised Descent Method), which can be manually assisted in the case of inaccurate positioning.

The contour defined in the present embodiment is a boundary caused by occlusion, and the contour is composed of contour points such as contours of face, ear, nose, and the like. A training-based method can be used for automatic detection of facial contours or by means of manual labeling.

Step S2: the key points in the three-dimensional facial model are acquired based on the three-dimensional facial model corresponding to the facial image.

Figure 4:
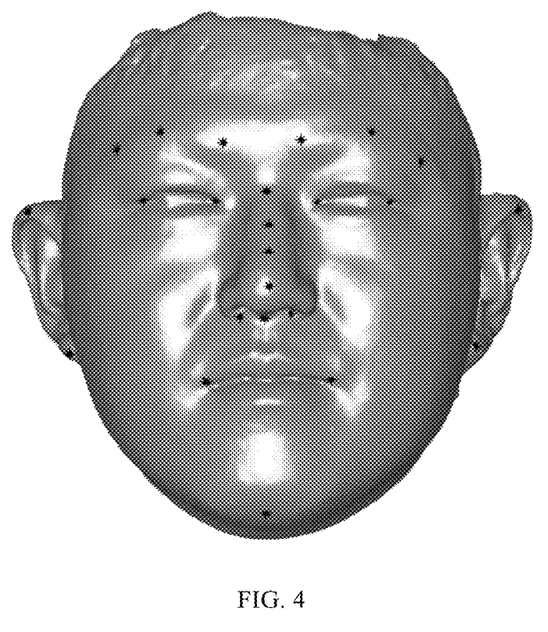
FIG. 4 is a schematic diagram showing a 3D facial model and key points in the 3D model according to an embodiment of the present disclosure.

The three-dimensional facial model (which is simplified as a 3D model below for the sake of convenience) may be acquired by using a high-precision face scanner. FIG. 4 shows the acquired 3D model of the corresponding face and the locations of the 24 face key points in the 3D model. In the application of the human face live detection, the two-dimensional facial image and three-dimensional facial model can be simultaneously acquired and stored. In the application of tampering forensic, some measures (which may require the cooperation of the individual involved) are used to obtain the three-dimensional model when investigating suspicious images, and it is more suitable for the police or court forensics. On this basis, the 3D facial key points can be acquired by automatic detection or with the assist of manual labeling.

Step S3: the camera parameters are calculated based on the correspondence between the key points in the two-dimensional facial image and the key points in the three-dimensional facial model.

In the present embodiment, step S3 may include the following two steps:

step S31: a camera projection matrix is calculated by using a gold standard method, based on the key points in the two-dimensional facial image and the key points in the three-dimensional facial model; and step S32: based on the camera projection matrix calculated in step S31, the camera parameters of 9 degrees of freedom are solved by adding a constraint that a pixel unit is square; the camera parameters of 9 degrees of freedom include the camera intrinsic parameters of 3 degrees of freedom and camera extrinsic parameters of 6 degrees of freedom.

The specific calculation method of the camera parameters is as follows.

First, the camera projection matrix P is estimated by using the classic 'Gold Standard Method' in camera calibration based on the correspondence between the key points in the 2D images and the key points in the 3D model. The estimation includes direct linear transformation (DLT) steps for optimizing algebraic errors, and a nonlinear iterative optimization steps (where Levenberg-Marquardt algorithm can be used) for optimizing geometric projection errors. Subsequently, the obtained projection matrix P is subjected to QR decomposition to obtain the camera intrinsic parameter matrix K, the rotation matrix R, and the translation vector t, which are shown in the following formula (1):

$$P = K[R|t] \qquad (1)$$

where, the intrinsic parameter matrix K having 5 degrees of freedom is named as intrinsic parameters including the pixel unit representations $f_x$ and $f_y$ of camera focal lengths in the x and y directions, the skew coefficient s of the pixel unit, and the camera optical center positions $c_x$ and $c_y$, respectively. The intrinsic parameter matrix is expressed as the following formula (2).

$$K = \begin{bmatrix} f_x & s & c_x \\ 0 & f_y & c_y \\ 0 & 0 & 1 \end{bmatrix} \qquad (2)$$

where R and t are respectively determined by a rotation angle of 3 degrees of freedom and translation of 3 degrees of freedom, and collectively referred to as extrinsic parameters. However, the intrinsic parameters obtained by simply using the gold standard method do not have a constraint that the pixel unit is square as shown in the formula (3).

$$\begin{cases} f_x = f_y \\ s = 0 \end{cases} \quad (3)$$

However, the existing cameras basically satisfy this condition, so after the intrinsic and extrinsic parameters are estimated by using the gold standard method, the constraint of the square pixel unit is further added for optimization to obtain more accurate camera parameters. The optimized objective function is the sum of squared geometric projection errors of the regularized key points, as shown in the formula (4):

$$E_{land}(\tilde{\theta}) = \Sigma_{i=1}^{N_l} d(v_i, P(\tilde{\theta})V_i)^2 + w_s s^2 + w_f (f_x - f_y)^2 \quad (4)$$

where $\tilde{\theta}$ represents the camera parameter with 11 degrees of freedom, v and V respectively represent the key points in the 2D image and the key points in the 3D model corresponding to the key points of the 2D image, $N_l$ is a number of the key points, $d(v_i, P(\tilde{\theta})V_i)$ represents the error between 2D projection of the key points of the 3D model and the key points in the 2D image, $w_s$ and $w_f$ are two regularization coefficients. In order not to increase the projection error in the process of adding the constraints, the weights of $w_s$ and $w_f$ are gradually increased from small to large, and the optimization is performed by multiple rounds. Each round of optimization employs the Levenberg-Marquardt algorithm for iterative solution. When the constraints are about to be basically satisfied, the hard constraint is finally added, i.e.

$$s = 0, f = \frac{f_x + f_y}{2},$$

at this time the intrinsic parameter has only 3 degrees of freedom, as shown in the following matrix expression (5):

$$K = \begin{bmatrix} f & 0 & c_x \\ 0 & f & c_y \\ 0 & 0 & 1 \end{bmatrix} \quad (5)$$

The sum of the squared errors between the two-dimensional projection of the key points in the three-dimensional facial model and the key points in the two-dimensional facial image (which may be simplified as a sum of squared key point projection errors for the sake of convenience), as shown in the formula (6):

$$E_{land}(\theta) = \Sigma_{i=1}^{N_l} d(v_i, P(\theta)V_i)^2 \quad (6)$$

where θ represents the constrained camera parameters of 9 degrees of freedom.

Step S4: the camera parameters obtained in step S3 are optimized based on the contour in the two-dimensional facial image.

The position of the key point of the face is defined from the semantic aspect, such as the corner of the eye, the tip of the nose, etc., but the exact position of these part is of a relatively great uncertain. For example, the position deviated a couple of pixels can also be regarded as the tip of the nose. Therefore, it is not enough to estimate based on the inaccurate key points in step S3. Hence, it is necessary to further optimize the camera parameters by the contour points of the contour in the image on the basis of the calculation of step S3. An optimization objective is a weighted sum of the sum of the squared projection errors of the contour points $E_{cont}(\theta)$ and the sum of the squared projection errors of the key points $E_{land}(\theta)$. An overall objective function is shown as the formula (7):

$$E_{totle}(\theta) = E_{cont}(\theta) + \lambda E_{land}(\theta) \quad (7)$$

where, θ is the camera parameters of 9 degrees of the freedom, $E_{land}(\theta)$ shown in formula (6) is the sum of squared projection errors of the key points, $E_{cont}(\theta)$ is the sum of the squared errors between the two-dimensional projection of the contour of the three-dimensional facial model and the contour of the two-dimensional facial image (i.e., the sum of the squared projection errors of the contour points), λ is a weight coefficient for weighing the two sums of squared errors.

$E_{cont}(\theta)$ is calculated with the following formula (8):

$$E_{cont}(\theta) = \Sigma_{i=1}^{N_c} d(c_i, P(\theta)C_i)^2 \quad (8)$$

where $N_c$ is a number of all contours, c, C respectively represent the contour points in the 2D image and the contour points in the 3D model corresponding to the 2D image.

Since the facial contour of the 3D model varies as the face posture changes, the objective function (7) is solved by using an iterative closest point (Iterative Closest Point, ICP) algorithm. The initial value of the camera parameter θ is provided by step S3 based on the estimation result of the key points. In each iteration of ICP, the Levenberg-Marquardt algorithm is used to optimize the nonlinear least squares problem, specifically including the following steps.

First, the contour points in the 3D model with the camera parameters in the current iteration step are found. For the sake of simplification, the occluded situation is ignored. In this embodiment, the contour points in the 3D model are defined as those points with their normal vector perpendicular to lines connected between these points and the optical center, as shown in the formula (9):

$$\mathcal{C}_3 = \{V_i | V_i \in v, 0 \leq (Rn_i)^T \cdot [R|t]V_i < \in\} \quad (9)$$

where, $\mathcal{C}_3$ represents a set of all 3D contour points, v represents a set of all 3D model points (i.e., all points on the 3D model), $n_i$ is a three-dimensional normal vector at the point $X_i$, and ∈ represents a minimal value.

Secondly, after the 3D contour point $\mathcal{C}_3$ is found, for each point in $\mathcal{C}_2$ (2D observation contour points), a point in $\mathcal{C}_2$ (the 2D projection of all 3D contour points found according to the equation (9)) closest to the corresponding point in $\mathcal{C}_2$ is found as the corresponding point, and invalid contour points with their closest distances greater than a set threshold are excluded. In this way, according to the closest point principle, the correspondence between the contour points in the 2D image and the hidden contour points in the 3D model with the current camera parameters is found, and then the objective function formula (7) is substituted with the above correspondence for parameter optimization. The Levenberg-Marquardt algorithm is also used for optimization of the nonlinear least squares problem, so as to calculate the parameters. Multiple rounds of iterations are performed in such a manner. In each round of iteration, the updating of the contour points of the 3D model, the updating of correspondence described above, and the parameter solving are performed in turn, until the result converges ultimately, i.e., the final estimation of the camera parameter is obtained.

Step S5: the key points in the two-dimensional facial image are randomly sampled, and steps S3 and S4 are repeated until the preset loop condition is satisfied; the camera intrinsic parameter estimation point cloud is acquired according to the camera parameters acquired in step S4 in each loop.

Figure 5:
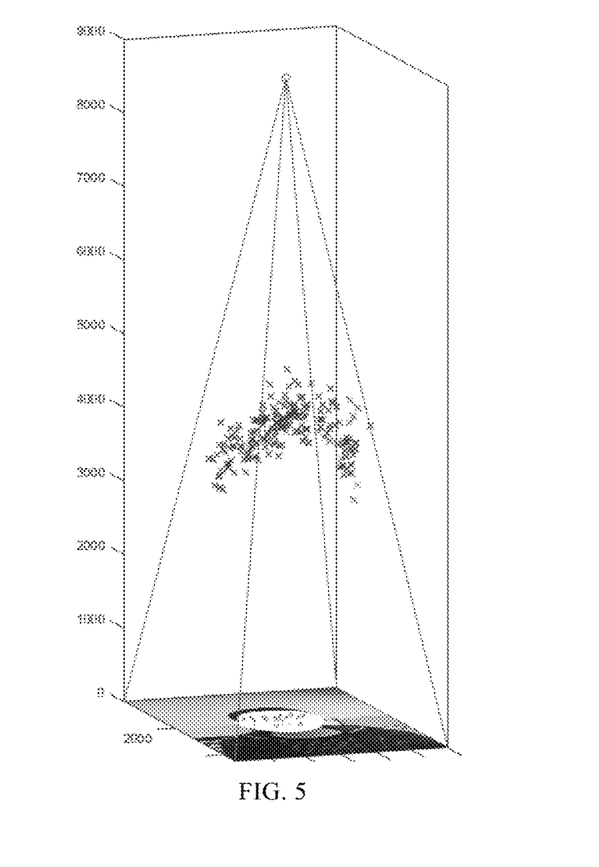
FIG. 5 is a schematic diagram showing a final result of a camera intrinsic parameter estimation point cloud and the points of the camera nominal intrinsic parameters according to an embodiment of the present disclosure.

Due to the uncertainty of the position of the key points of the face, the camera parameters are estimated multiple times by sampling, and ultimately the uncertainty range of the camera intrinsic parameter estimation is obtained, i.e., the camera intrinsic parameter estimation point cloud (the set of camera intrinsic parameter estimation points) is obtained. The key points that are sampled from the key points in the 2D image follow the Gaussian distribution and are centered on the initial key point position in step S1 with the average error $$\sqrt{\frac{E_{land}}{N_l}}$$

obtained in step S3 when using the initial key point positions as the standard deviation. After each random sampling of all the key points, steps S3 and S4 are repeated for parameter estimation, and finally an estimated point cloud of the camera intrinsic parameter ($c_x$, $c_y$, f) of the 3 degrees of freedom is obtained. In step S5, the number of loops may be determined according to the preset loop condition, and the loop condition may be the loops of the preset number of loops, and may also be other preset convergence conditions. FIG. 5 shows the point cloud of the camera intrinsic parameter position distribution obtained by performing 200 times of sample estimation according to the preset loop number. The range of the point cloud represents the uncertainty range of the intrinsic parameter estimation. As shown in FIG. 5, there is a relatively large distance between the estimated point cloud (points of the triangular pyramid) and the nominal value (tapered apex).

Step S6: the inconsistency between the camera intrinsic parameter estimation point cloud and the camera nominal intrinsic parameters is calculated and the authenticity of the facial image is determined based on the inconsistency. The camera nominal intrinsic parameters are the parameters of the camera that captures the two-dimensional facial image.

The method for determining the facial image spoof is to judge the inconsistency between the camera intrinsic parameter estimation point cloud and the camera nominal intrinsic parameters. Specifically, in the application of facial live object detection, the camera nominal intrinsic parameters can be obtained by calibrating the camera of the facial recognition system, and in the application of tampering forensics, the camera nominal intrinsic parameters can be obtained by extracting the EXIF header or other methods. The measure of distance D between the camera intrinsic parameter estimation point cloud and the points of the camera nominal intrinsic parameters is based on the Mahalanobis distance, as shown in the formula (10):

$$D(\{\hat{\theta}_i^{in}\},\theta^{in})=\sqrt{(\theta^{in}-\mu)^T\Sigma^{-1}(\theta^{in}-\mu)} \quad (10)$$

where $\{\hat{\theta}_i^{in}\}$ is the camera intrinsic parameter estimation point cloud, $\theta^{in}$ is the camera nominal intrinsic parameter, $\mu$ and $\Sigma$ respectively represent the average value and the covariance matrix of $\{\hat{\theta}_i^{in}\}$.

The method for determining the authenticity of the facial image based on the inconsistency includes:

when $D>D_t$, the image is determined as a deceptive image, otherwise the image is determined as a normal image;

wherein $D_t$ is a preset determination threshold.

The determination threshold $D_t$ is acquired by experimenting on the data set. In the present embodiment, the determination threshold obtained from experimental data is $D_t=3$.

The data shown in FIG. 5 can be calculated to obtain the result $D=20.4>D_t$, so the technical solution in the present embodiment can successfully detect the recaptured image.

A storage device according to an embodiment of the present disclosure includes a plurality of programs stored therein, and the programs are capable of being loaded by a processor to execute the above-mentioned perspective distortion characteristic based facial image authentication method.

A processing device according to an embodiment of the present disclosure includes a processor and a storage device. The processor is capable of executing the program; the storage device is capable of storing a plurality of programs; and the programs are capable of being loaded by the processor to execute the above-mentioned perspective distortion characteristic based facial image authentication method.

The method or algorithm described in the embodiments disclosed in the present disclosure can be executed by hardware, software module executed by the processor, or a combination of both. The software module can be arranged in a random access memory (RAM), a memory, a read only memory (ROM), an electrically programmable ROM, an electrically erasable programmable ROM, a register, a hard disk, a removable magnetic disk, a CD-ROM, or in any other form of storage medium known in the art.

Those skilled in the art should be able to realize that the method or algorithm described in the embodiments disclosed in the present disclosure can be executed by electronic hardware, computer software, or a combination of both. In order to clarify the interchangeability of the electronic hardware and software, the elements and steps of the various embodiments have been generally described in terms of function in the above description. Whether these functions are performed with the electronic hardware or the software depends on the specific application and design constraints of the technical solution. Those skilled in the art can use different methods to execute the described functions for each particular application scenario, and such execution should not be considered as extend beyond the scope of the present disclosure.

So far, the technical solutions of the present disclosure have been described in combination of the preferred embodiments shown in the drawings. As for those skilled in the art, it is easy to understand that, the scope of the present disclosure is not limited to the above-mentioned embodiments. Various equivalent modifications and substitutions of related technical features may be made by those skilled in the art without departing from the principles of the present disclosure, and these equivalent modifications and substitutions should be considered as falling within the scope of the present disclosure.

What is claimed is:

1. A perspective distortion characteristic based facial image authentication method comprising:

step S1: recognizing key points and a contour in a two-dimensional facial image;

step S2: acquiring key points in a three-dimensional facial model based on the three-dimensional facial model corresponding to the two-dimensional facial image;

step S3: calculating camera parameters based on a correspondence between the key points in the two-dimensional facial image and the key points in the three-dimensional facial model;

step S4: optimizing the camera parameters obtained in step S3 based on the contour in the two-dimensional facial image;

step S5: randomly sampling the key points in the two-dimensional facial image, and repeating steps S3 and S4 until a preset loop condition is satisfied, and obtaining a camera intrinsic parameter estimation point cloud according to the camera parameters acquired in step S4 in each loop; and step S6: calculating an inconsistency between the camera intrinsic parameter estimation point cloud and camera nominal intrinsic parameters, and determining an authenticity of the two-dimensional facial image based on the inconsistency; wherein the camera nominal intrinsic parameters are parameters of a camera capturing the two-dimensional facial image, wherein a method for calculating the camera parameters in step S3, comprises:

step S31: calculating a camera projection matrix by using a gold standard method based on the key points in the two-dimensional facial image and the key points in the three-dimensional facial model; and step S32: based on the camera projection matrix calculated in step S31, solving for the camera parameters of 9 degrees of freedom by adding a constraint that a pixel unit is square; the camera parameters of 9 degrees of freedom comprise camera intrinsic parameters of 3 degrees of freedom and camera extrinsic parameters of 6 degrees of freedom.

2. The perspective distortion characteristic based facial image authentication method according to claim 1, wherein optimizing the camera parameters in step S4 comprises optimizing the camera parameters through an optimization function $E_{totle}(\theta)$:

$$E_{totle}(\theta)=E_{cont}(\theta)+\lambda E_{land}(\theta)$$

wherein $\theta$ refers to the camera parameters of 9 degrees of freedom, $E_{cont}$ is a sum of squared errors between a two-dimensional projection of the contour in the three-dimensional facial model and the contour in the two-dimensional facial image, $E_{land}$ is a sum of squared errors between a two-dimensional projection of the key points in the three-dimensional facial model and the key points in the two-dimensional facial image, and $\lambda$ is a weight coefficient.

3. The perspective distortion characteristic based facial image authentication method according to claim 2, wherein the optimization function $E_{totle}$ is solved based on an iterative closest point algorithm, in each iteration of the iterative closest point algorithm, a Levenberg-Marquardt algorithm is used to optimize a nonlinear least squares problem.

4. The perspective distortion characteristic based facial image authentication method according to claim 1, wherein in step S5, the key points in the two-dimensional facial image are randomly sampled and the samples follow a Gaussian distribution centered on an initial position, and an average error of the key points optimized in step S4 is a standard deviation;

wherein, $E_{land}$ is a sum of squared errors between a two-dimensional projection of the key points in the three-dimensional facial model and the key points in the two-dimensional facial image.

5. The perspective distortion characteristic based facial image authentication method according to claim 1, wherein a method for calculating the inconsistency between the camera intrinsic parameter estimation point cloud and the camera nominal intrinsic parameters in step S6 comprises:

expressing the inconsistency with a Mahalanobis distance D between the camera intrinsic estimation point cloud and the camera nominal intrinsic parameters;

$$D(\{\hat{\theta}_i^{in}\},\theta^{in})=\sqrt{(\theta^{in}-\mu)^T\Sigma^{-1}(\theta^{in}-\mu)}$$

wherein $\{\hat{\theta}_i^{in}\}$ is the camera intrinsic estimation point cloud, $\theta^{in}$ is the camera nominal intrinsic parameter, $\mu$ and $\Sigma$ respectively represent an average value and a covariance matrix of $\{\hat{\theta}_i^{in}\}$.

6. The perspective distortion characteristic based facial image authentication method according to claim 5, wherein a method for determining an authenticity of the facial image based on the inconsistency comprises:

if $D>D_t$, determining the two-dimensional facial image to be a deceptive image, otherwise determining the two-dimensional facial image to be a normal image;

wherein, $D_t$ is a preset determination threshold.

7. The perspective distortion characteristic based facial image authentication method according to claim 2, wherein $$E_{land}(\theta) = \sum_{i=1}^{N_l} d(v_i, P(\theta)V_i)^2$$

wherein $\theta$ represents constrained camera parameters of 9 degrees of freedom, v and V respectively represent the key points in the two-dimensional facial image and the key points in the three-dimensional facial model, and $N_l$ is the number of the key points.

8. The perspective distortion characteristic based facial image authentication method according to claim 2, wherein the following equation is satisfied $$E_{cont}(\theta) = \sum_{i=1}^{N_c} d(c_i, P(\theta)C_i)^2$$

wherein $\theta$ represents constrained camera parameters of 9 degrees of freedom, $N_c$ is the number of the contour, c and C respectively represent contour points in the two-dimensional facial image and contour points in the three-dimensional facial model.

9. The perspective distortion characteristic based facial image authentication method according to claim 1, wherein the preset loop condition in step S5 is a preset number of loops.

10. A storage device storing a plurality of programs, wherein the programs are capable of being loaded by a processor to execute a perspective distortion characteristic based facial image authentication method comprising step S1: recognizing key points and a contour in a two-dimensional facial image;

step S2: acquiring key points in a three-dimensional facial model based on the three-dimensional facial model corresponding to the two-dimensional facial image;

step S3: calculating camera parameters based on a correspondence between the key points in the two-dimensional facial image and the key points in the three-dimensional facial model;

step S4: optimizing the camera parameters obtained in step S3 based on the contour in the two-dimensional facial image;

step S5: randomly sampling the key points in the two-dimensional facial image, and repeating steps S3 and S4 until a preset loop condition is satisfied, and obtaining a camera intrinsic parameter estimation point cloud according to the camera parameters acquired in step S4 in each loop; and step S6: calculating an inconsistency between the camera intrinsic parameter estimation point cloud and camera nominal intrinsic parameters, and determining an authenticity of the two-dimensional facial image based on the inconsistency; wherein the camera nominal intrinsic parameters are parameters of a camera capturing the two-dimensional facial image, wherein a method for calculating the camera parameters in step S3, comprises:

step S31: calculating a camera projection matrix by using a gold standard method based on the key points in the two-dimensional facial image and the key points in the three-dimensional facial model; and step S32: based on the camera projection matrix calculated in step S31, solving for the camera parameters of 9 degrees of freedom by adding a constraint that a pixel unit is square; the camera parameters of 9 degrees of freedom comprise camera intrinsic parameters of 3 degrees of freedom and camera extrinsic parameters of 6 degrees of freedom.

11. A processing device comprising:

a processor, capable of executing a plurality of programs; and a storage device, capable of storing the plurality of programs;

wherein the programs are capable of being loaded by the processor to execute a perspective distortion characteristic based facial image authentication method comprising step S1: recognizing key points and a contour in a two-dimensional facial image;

step S2: acquiring key points in a three-dimensional facial model based on the three-dimensional facial model corresponding to the two-dimensional facial image;

step S3: calculating camera parameters based on a correspondence between the key points in the two-dimensional facial image and the key points in the three-dimensional facial model;

step S4: optimizing the camera parameters obtained in step S3 based on the contour in the two-dimensional facial image;

step S5: randomly sampling the key points in the two-dimensional facial image, and repeating steps S3 and S4 until a preset loop condition is satisfied, and obtaining a camera intrinsic parameter estimation point cloud according to the camera parameters acquired in step S4 in each loop; and step S6: calculating an inconsistency between the camera intrinsic parameter estimation point cloud and camera nominal intrinsic parameters, and determining an authenticity of the two-dimensional facial image based on the inconsistency; wherein the camera nominal intrinsic parameters are parameters of a camera capturing the two-dimensional facial image, wherein a method for calculating the camera parameters in step S3, comprises:

step S31: calculating a camera projection matrix by using a gold standard method based on the key points in the two-dimensional facial image and the key points in the three-dimensional facial model; and step S32: based on the camera projection matrix calculated in step S31, solving for the camera parameters of 9 degrees of freedom by adding a constraint that a pixel unit is square; the camera parameters of 9 degrees of freedom comprise camera intrinsic parameters of 3 degrees of freedom and camera extrinsic parameters of 6 degrees of freedom.

* * * * *